Apr. 10, 1923. 1,451,213

H. K. GILBERT

DIRECTION SIGNAL FOR AUTOMOBILES

Filed Jan. 26, 1921

Witness.
James F. FitzGibbon

Inventor
Harold K. Gilbert.
By Chandler & Chandler
Attorneys

Patented Apr. 10, 1923.

1,451,213

UNITED STATES PATENT OFFICE.

HAROLD K. GILBERT, OF GARNER, IOWA.

DIRECTION SIGNAL FOR AUTOMOBILES.

Application filed January 26, 1921. Serial No. 440,085.

*To all whom it may concern:*

Be it known that I, HAROLD K. GILBERT, a citizen of the United States, residing at Garner, in the county of Hancock, State of Iowa, have invented certain new and useful Improvements in Direction Signals for Automobiles; and I do hereby declare the following to be a full, clear, and exact description of the invention, such as will enable others skilled in the art to which it appertains to make and use the same.

This invention relates to new and useful improvements in signals and particularly to signals for automobiles.

One object is to provide a direction signal for a closed automobile of the sedan type, so that the driver can readily extend a warning sign to other vehicles, without the necessity of raising the window and extending his arm.

In the use of closed automobiles, especially in cold or rainy weather, it is not convenient for the driver to extend his hand to signal to the drivers of other vehicles, in view of the fact that the doors and windows are kept closed, and if one is kept open to permit this extending of the arm, it is to the discomfort of the driver and the other occupants of the automobile.

The present invention provides for the extension of a signal arm, operable from within the automobile, and without the necessity of keeping any of the doors or windows open.

Other objects and advantages will be apparent from the following description when taken in connection with the accompanying drawing.

Figure 1:
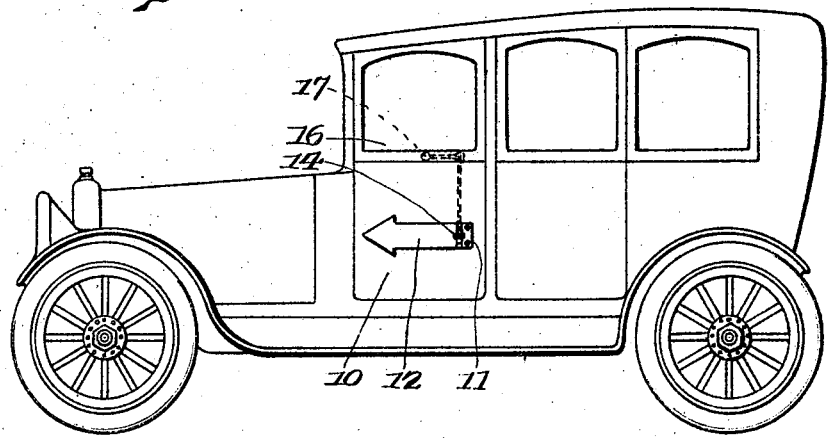
Figure 1 is a side elevation of an automobile of the sedan type, showing the invention applied thereto, and in inoperative position.
Figure 3:
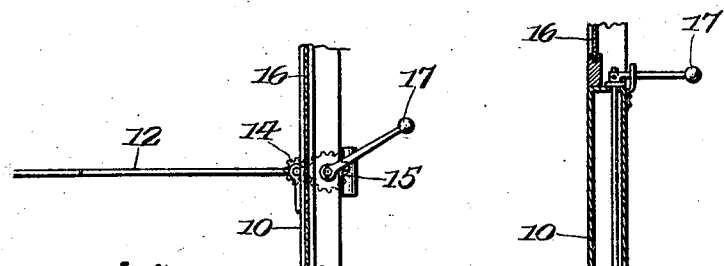
Figure 3 is a horizontal sectional view on the line 3—3 of Figure 2.
Figure 2:
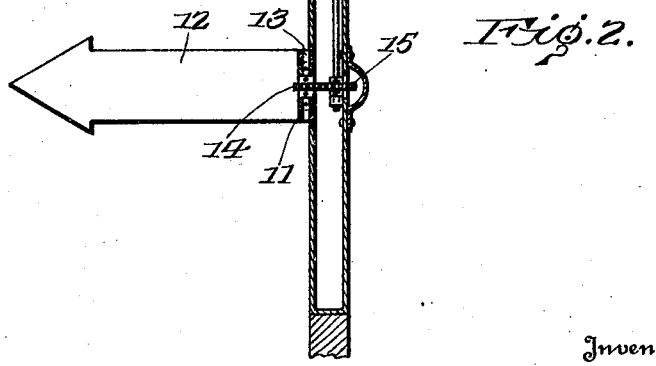
Figure 2 is an enlarged vertical sectional detail view through the door of the automobile, on the line 2—2 of Figure 1, showing the operating means, the signal arm being in extended position.

Referring particularly to the accompanying drawing, 10 represents the front door of a sedan type of automobile. Mounted on the outer face of the door, by means of the hinge 11, is a horizontally swingable arm 12, in the form of an arrow, said arm being adapted, when in inoperative position, to lie flatly against the outer face of the door, and when in operative position, to extend perpendicularly outwardly from the door. On the intermediate portion of the pintle 13 of the hinge 11, is secured a small gear 14 which meshes with a similar gear 15, carried by a vertical shaft mounted to extend vertically within the lower portion of the door, and having its upper end disposed above the ledge of the window 16 thereof, where it is provided with a radially extending hand lever 17. It will be noted that the hand lever 17 extends parallel to and above the arm 12, when the arm is in inoperative position against the door, and that said lever extends in the same direction as does said arm. To swing the arm outwardly into indicating or signaling position the lever 17 is inwardly in a direction transversely of the automobile, the gears 14 and 15 causing the arm 12 to swing outwardly in a direction opposite to that of the lever. The arm 12 is preferably painted or enameled black or some bright color, so that it will readily attract the attention of the drivers of other vehicles.

What is claimed is:

In a direction signal for automobiles, the combination with the double-walled door of an automobile, the wall portions of the door having aligned openings, a bearing bracket mounted on one of the wall portions within the door and adjacent the opening thereof, a bracket on the upper end of the door, a vertical shaft disposed between the wall portions of the door and rotatably supported in said brackets, a gear on the shaft partially protruding through the opening of the adjacent wall portion, a housing on the door covering the said opening and gear, means for rotating the shaft, a signal arm mounted on the outer face of the outer wall portion of the door adjacent the opening thereof and having a gear projecting through the opening and engaging the gear of the shaft.

In testimony whereof, I affix my signature, in the presence of two witnesses.

HAROLD K. GILBERT.

Witnesses:
PETER GILBERT,
A. KELLY.